(12) United States Patent
Rajaraman et al.

(10) Patent No.: US 11,199,463 B2
(45) Date of Patent: Dec. 14, 2021

(54) PRESSURE SENSOR SYSTEM HAVING A LAND GRID ARRAY/MOLD PREMOLD STRUCTURE AND METHOD FOR ITS MANUFACTURE

(71) Applicant: Robert Bosch GmbH, Stuttgart (DE)

(72) Inventors: Vijaye Rajaraman, Reutlingen (DE); Holger Scholzen, Stuttgart (DE); Thomas Klaus, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 16/631,231

(22) PCT Filed: Jul. 19, 2018

(86) PCT No.: PCT/EP2018/069641
§ 371 (c)(1),
(2) Date: Jan. 15, 2020

(87) PCT Pub. No.: WO2019/016320
PCT Pub. Date: Jan. 24, 2019

(65) Prior Publication Data
US 2020/0217736 A1 Jul. 9, 2020

(30) Foreign Application Priority Data
Jul. 20, 2017 (DE) .................. 102017212422.9

(51) Int. Cl.
*G01L 19/06* (2006.01)
*G01L 9/00* (2006.01)
*G01L 19/14* (2006.01)

(52) U.S. Cl.
CPC ........ *G01L 19/0645* (2013.01); *G01L 9/0055* (2013.01); *G01L 19/14* (2013.01)

(58) Field of Classification Search
None
See application file for complete search history.

(56) References Cited

U.S. PATENT DOCUMENTS 5,218,972 A 6/1993 Gorsuch et al.
6,311,561 B1 11/2001 Bang et al.
(Continued)

FOREIGN PATENT DOCUMENTS

DE 102012210752 A1 1/2014
JP H1082707 A 3/1998
(Continued)

OTHER PUBLICATIONS

International Search Report for PCT/EP2018/069641, dated Oct. 23, 2018.

*Primary Examiner* — Andre J Allen
*Assistant Examiner* — Jermaine L Jenkins
(74) *Attorney, Agent, or Firm* — Norton Rose Fulbright US LLP; Gerard Messina

(57) ABSTRACT

A pressure sensor system including at least one pressure sensor unit configured as a system-in-package, the pressure sensor unit encompassing a supporting structure including a cavity and a sensor element situated in the cavity; the supporting structure being formed by a land grid array/mold premold structure (LGA/MPM) and signal-processing elements being integrated into and/or on the supporting structure; the pressure sensor unit being introduced into a pressure sensor housing provided with a diaphragm and being supported therein, and a residual volume of the pressure sensor housing provided with at least one diaphragm being filled with an incompressible fluid; and the pressure sensor housing including a groove extending around the pressure sensor unit, in which a sealing ring is situatable.

11 Claims, 3 Drawing Sheets

(56) References Cited

U.S. PATENT DOCUMENTS

| | | | |
|---|---|---|---|
| 6,577,244 B1 | 6/2003 | Clark et al. | |
| 6,938,490 B2 | 9/2005 | Wagner et al. | |
| 7,900,521 B2 * | 3/2011 | Hooper | G01L 19/141 73/756 |
| 8,902,604 B2 * | 12/2014 | Zoellin | H04R 19/04 361/761 |
| 9,425,119 B2 * | 8/2016 | Chang | B81B 7/0061 |
| 10,605,684 B2 * | 3/2020 | Gritti | G01L 9/0045 |
| 2002/0029639 A1 | 3/2002 | Wagner et al. | |
| 2013/0113054 A1 | 5/2013 | Yow et al. | |
| 2014/0260678 A1 | 9/2014 | Jentoft et al. | |
| 2015/0162264 A1 | 6/2015 | Chang et al. | |
| 2020/0200634 A1 * | 6/2020 | Schiller | G01L 19/0627 |

FOREIGN PATENT DOCUMENTS

| | | |
|---|---|---|
| JP | H10300606 A | 11/1998 |
| JP | 2017514129 A | 6/2017 |
| WO | 9001153 A1 | 2/1990 |

* cited by examiner

PRESSURE SENSOR SYSTEM HAVING A LAND GRID ARRAY/MOLD PREMOLD STRUCTURE AND METHOD FOR ITS MANUFACTURE

FIELD OF THE INVENTION

The present invention relates to a pressure sensor system including at least one pressure sensor unit and to a method for manufacturing a pressure sensor system, which encompasses at least one pressure sensor unit.

BACKGROUND INFORMATION

Pressure sensor systems are believed to be understood, which include micromechanically processed, electronic pressure sensors (MEMS pressure sensors), which encompass at least one deformable, pressure-sensitive diaphragm, which is typically subjected to the media surroundings of interest, in order to continuously measure and monitor the pressure there. While, in this case, for example, the measurement of the atmospheric pressure in applications of consumer electronics merely requires a stable sensor module within a protective housing (for example, a mobile phone), the same electronic pressure sensor requires the usage of an insulation medium (for example, a gel or oil) as additional protection against dust, particles, moisture, or exhaust gases, as well as further corrosive or aggressive media in industrial or automotive applications.

Approaches related to such challenges of media insulation by forming a robust module are discussed, for example, in U.S. Pat. Nos. 6,311,561 B1, 6,577,244 B2, and 6,938,490 B2.

SUMMARY OF THE INVENTION

The present invention provides a pressure sensor system including at least one pressure sensor unit configured as a system-in-package, SiP, the pressure sensor unit encompassing a supporting structure including a cavity with a sensor element situated in the cavity; the supporting structure being formed by a land grid array/mold premold structure (LGA/MPM) and signal-processing elements being integrated into and/or on the supporting structure; the pressure sensor unit being introduced into a sensor housing provided with a diaphragm and being supported therein, and a residual volume of the sensor housing being provided with at least one diaphragm filled with an incompressible fluid; and the sensor housing including a groove extending around the pressure sensor unit, in which a sealing ring is situatable.

The present invention further provides a method for manufacturing a pressure sensor system, which encompasses at least one pressure sensor unit configured as a system-in-package, including at least the following method steps:

manufacturing the pressure sensor unit by providing a sensor element, situating the sensor element in a cavity of a supporting structure, which is formed by a land grid array/mold premold structure (LGA/MPM), at least one signal processing unit, in particular an ASIC, being integrated into and/or on the supporting structure, and subsequently integrating the supporting structure with the sensor element to form the pressure sensor unit;
  providing a pressure sensor housing including a diaphragm, a cavity adjacent to the diaphragm, and a groove extending around the cavity, in which a sealing ring is mountable;
  introducing the pressure sensor unit into the cavity of the pressure sensor housing and supporting the pressure sensor unit in the pressure sensor housing;
  filling a residual volume of the cavity remaining within the pressure sensor housing with an incompressible fluid; and
  sealing the cavity with the incompressible fluid.

With the aid of the present invention, a protection with respect to aggressive media is therefore made available, in a suitable way and, in particular, using a simple and cost-effective apparatus (device or arrangement), for an LGA/MPM supporting structure, which is embeddable (moldable) together with a sensor element to form a pressure sensor unit. The sensor element may therefore be a pressure sensor element.

With respect to the described pressure sensor system, it is advantageous that a better part of the elements of the pressure sensor unit, for example, a sensor membrane of the sensor element, application-specific integrated circuits (ASICs), and other passive components, as well as their bonding pads and/or bonding wires are protected on the same side (top side) by a fluid buffer, in particular an oil buffer. As a result, these elements are protected against aggressive media, such as corrosive fluids and gases.

The pressure sensor system is advantageously configured in such a way that pressure is exerted onto the LGA/MPM-SiP only from one single side, namely the top side, on which side the incompressible fluid is also in contact with the sensor element.

The pressure sensor system may be manufactured with the aid of standardized machines from semiconductor/MEMS manufacturing and packaging, for example, with the aid of pick-and-place methods.

The LGA/MPM-SiP may be advantageously adjusted, in large quantities (high volume) before the embedding into the pressure sensor housing with respect to temperature, having been compensated in such a way that an already compensated pressure sensor unit is usable immediately or at any time in a pressure sensor system, which may also be cost-effectively provided, since this compensation may be carried out with respect to known parameters on the LGA/MPM pressure sensor unit as a system-in-package for several pressure sensor units in a short time. This is also associated with the situation in which these pressure sensor units may be produced and processed with the aid of standard machines commonly utilized in the fabrication of semiconductors, in particular of MEMS modules, and in the assembly thereof to form measuring modules.

The pressure sensor system may be referred to as a first-level packaging and is particularly well connectable to, for example, a peripheral second-level packaging with the aid of a sealing ring situated in the groove, for example for sensors in the automotive sector.

The subject matter of the further embodiments and descriptions herein contains further advantageous features.

According to an advantageous refinement, the groove is situated laterally with respect to the pressure sensor unit. It particularly may be provided for when the groove is situated in an area of the pressure sensor housing lowered with respect to a plane in which the diaphragm is situated. Therefore, the pressure sensor system, after its production, may be installed in a gas-tight and particularly space-saving manner, for example, in a peripheral second-level package.

In another advantageous refinement, the sensor element may be provided and configured as an APSM (advanced porous silicon MEMS) sensor element, which is situated in a precast cavity of the LGA/MPM. The sensor element is manufactured, in this case, in an advantageous way in an APSM (advanced porous silicon membrane) process in which a monocrystalline starting layer for the subsequent diaphragm is generated. This is subsequently underetched with the aid of an etching method and a porous silicon layer is produced, where a cavity will be subsequently located. Thereafter, a monocrystalline silicon layer is epitaxially applied, which subsequently forms the sensor element diaphragm. With the aid of temperature application (atomic shift), a cavity under vacuum is created, which subsequently allows for the measurement of absolute pressure. Piezoresistors applied on the diaphragm then measure the deflection of the diaphragm. With the aid of this APSM process, a robust diaphragm may be created; in addition, this process suffices, in an advantageous way, with purely surface-mechanical processing. The resultant monocrystalline layer is absolutely tight and stable. The sensor element may also be configured in a different way, for example, as a so-called stress-decoupled sensor element. According to a further advantageous refinement, the diaphragm is made of a steel or a plastic. The sensor housing may also be made of a plastic. Therefore, the pressure sensor system may be manufactured in a particularly robust and simultaneously cost-effective manner.

According to a further advantageous refinement, at least one joint between the sensor housing and the pressure sensor unit is filled with a synthetic resin, in particular an epoxy resin, and/or an adhesive. Therefore, in an even better way, the situation in which the introduced incompressible fluid escapes again from the pressure sensor housing may be prevented.

Protecting the sensor element against aggressive and/or corrosive media in a suitable way, the incompressible fluid may be in the form of oil, for example, synthetic oil. The utilization of other incompressible fluids or media, for example, other suitable oils, is also conceivable.

According to a further advantageous refinement, the pressure sensor housing may include a narrow fluid filling duct, which, after the incompressible fluid has been filled, is or will be sealed with the aid of a sealing ball (ball-press sealing). The fluid filling duct may open at a lateral outer side of the pressure sensor housing and, in specific embodiments, may extend largely in parallel to the diaphragm of the pressure sensor housing.

With respect to further features and advantages, reference may be made to the comments presented above and below with respect to the pressure sensor system according to the present invention and its manufacturing method.

The aforementioned embodiments and refinements may be arbitrarily combined with each other, provided this is reasonable. Further possible embodiments, refinements, and implementations of the present invention also include non-explicitly mentioned combinations of features of the present invention described above or in the following with respect to the exemplary embodiments. In particular, those skilled in the art will also add individual aspects as improvements or additions to the particular basic form of the present invention.

The present invention is explained below in greater detail with reference to exemplary embodiments in the figures.

In all figures, identical or functionally identical elements and devices are labeled using the same reference numerals, unless indicated otherwise.

DETAILED DESCRIPTION

Figure 1:
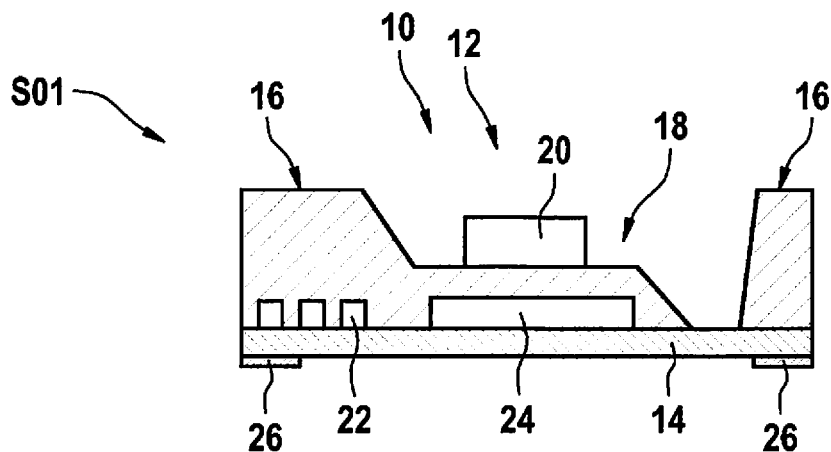
FIG. 1 shows a partial schematic cross-sectional view of a pressure sensor unit.

In FIG. 1, a pressure sensor system, labeled 10 in its entirety, including arising pressure sensor unit 12 is initially apparent. An LGA substrate 14 is apparent, on which passive components 22 in the form of resistors are integrated. LGA substrate 14, already including an ASIC 24, is joined to an LGA/MPM supporting structure 16 with the aid of a plastic. During the production of supporting structure 16, a cavity 18 was saved, into which, in the representation from FIG. 1, an APSM sensor element 20, i.e., an advanced porous silicon MEMS sensor element 20, is placed. After the contacting thereof, sensor element 20 is embedded into supporting structure 16 and, in this way, pressure sensor unit 12 is created.

Metallized contact elements 26, which are utilized for the electrical contacting of pressure sensor unit 12, are apparent on the side of the substrate facing away from cavity 18.

Figure 5:
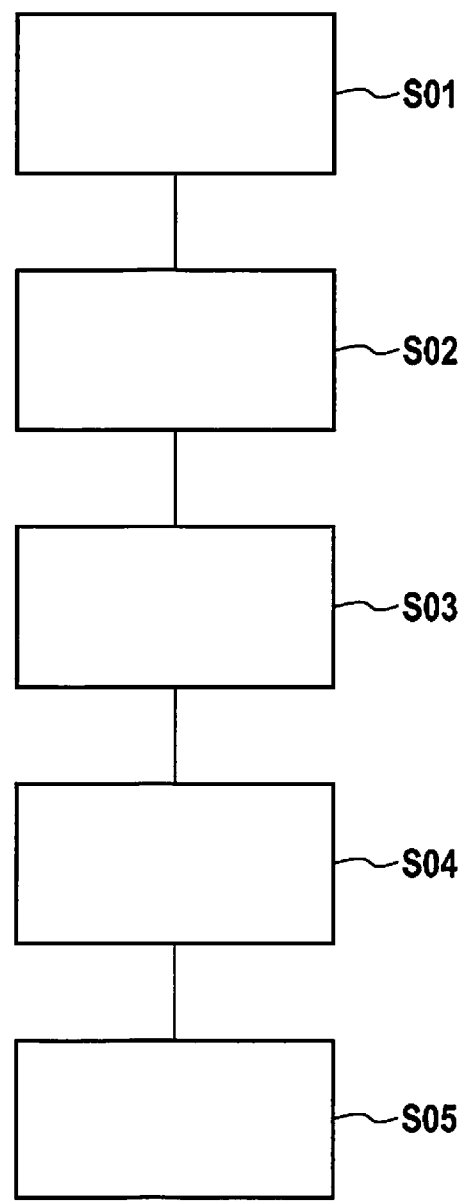
FIG. 5 shows a partial schematic flow chart for explaining a manufacturing method of a pressure sensor system according to a further specific embodiment of the present invention.

FIG. 1 simultaneously explains a first step S01 of a method for manufacturing a pressure sensor system 10, which is additionally illustrated in FIG. 5 with the aid of a flow chart. In step S01, pressure sensor unit 12 is manufactured, in particular by providing a sensor element 20, placing sensor element 20 in a cavity 18 of a supporting structure 16, in and/or on which at least one signal processing element, in particular an ASIC 24, is integrated, and subsequently embedding supporting structure 16 together with sensor element 20 to form pressure sensor unit 12, in particular having the further optional properties as explained in greater detail above with reference to FIG. 1.

Figure 2:
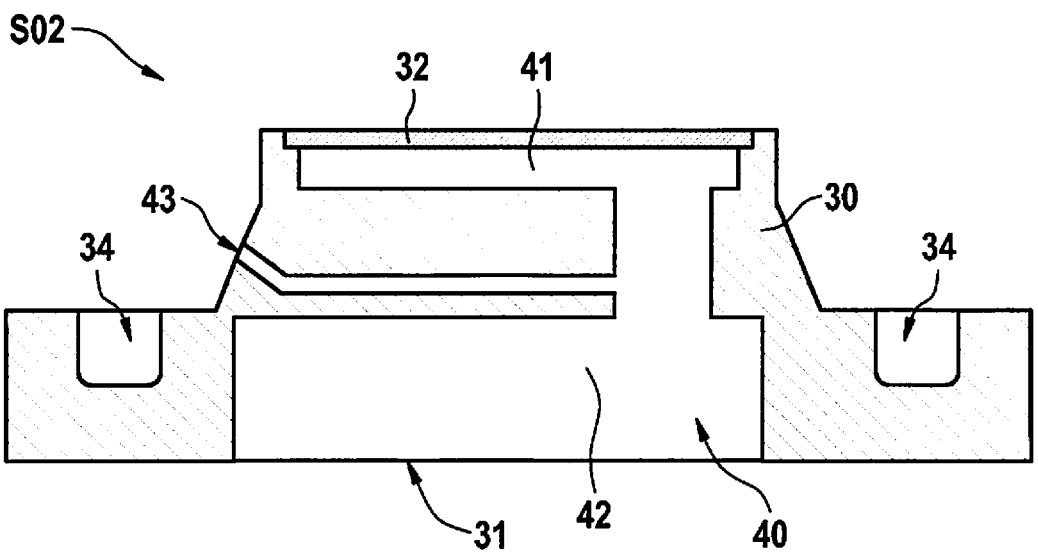
FIG. 2 shows a partial schematic cross-sectional view of the pressure sensor system, depicted during manufacture, according to a specific embodiment of the present invention.

FIG. 2 shows a schematic cross-sectional view of a pressure sensor housing 30 for use in a pressure sensor system 10.

Pressure sensor housing 30 encompasses a cavity 40, into which pressure sensor unit 12 is insertable at least in such a way that contact elements 26 are also accessible from outside pressure sensor housing 30 when pressure sensor unit 12 is inserted into cavity 40.

Pressure sensor housing 30 also includes a diaphragm 32, which may be made of steel, which rests against an outer side of pressure sensor housing 30, on the one hand, and delimits cavity 40, on the other hand. With the aid of diaphragm 32, pressure waves from outside pressure sensor housing 30 are coupleable into cavity 40.

Cavity 40 may be configured in such a way that it is roughly subdivided into a first chamber 41, a second chamber 42, and a fluid filling duct 43. As shown in FIG. 2, fluid filling duct 43 is situated and configured, for example, in such a way that it has an elongate, narrow shape and is connected at one end to the outer side of pressure sensor housing 30 and, at another end, is fluidically connected between first chamber 41 and second chamber 42. First chamber 41 rests internally against diaphragm 32, while second chamber 42 is configured for accommodating pressure sensor unit 12.

The subdivision of cavity 40 into individual chambers 41, 42 may be utilized for reducing the volume of cavity 40, where, simultaneously, a) large diaphragm 32 may be connected completely to cavity 40, in order to enable a good coupling of pressure waves into cavity 40, and b) sufficient space is to be available in cavity 40, in order to accommodate pressure sensor unit 12.

Fluid filling duct 43 may open at a lateral outer side of pressure sensor housing 30 and may extend largely in parallel to diaphragm 32 of pressure sensor housing 30. Due to the lateral mouth, the opening of fluid filling duct 43 takes up no space on the top side of pressure sensor system 10 and of pressure sensor housing 30, so that the entire top side may be comprehensively taken up by diaphragm 32. This effectuates a large amount of design freedom for components, into which pressure sensor system 10 is to be installed.

In the lateral direction, extending around cavity 40, a groove 34 is formed in pressure sensor housing 30, which is provided to accommodate a sealing ring 36 (which may also be referred to as an O-ring). Groove 34 may be situated in an area of pressure sensor housing 30, which is lowered with respect to a plane in which diaphragm 32 is situated, so that pressure sensor system 10, after its completion, may be installed in a gas-tight and particularly space-saving manner, for example, in a peripheral second-level package.

The lateral mouth of fluid filling duct 43 may be situated on a conically shaped section of pressure sensor housing 30, which is situated between groove 34 and diaphragm 32.

FIG. 2 at the same time explains a further step S02 of the method from FIG. 5 for manufacturing a pressure sensor system 10. In step S02, a pressure sensor housing 30 is made available, which encompasses a diaphragm 32 and a cavity 40 adjoining diaphragm 32, in particular having the further optional properties as explained in greater detail above with reference to FIG. 2.

Figure 3:
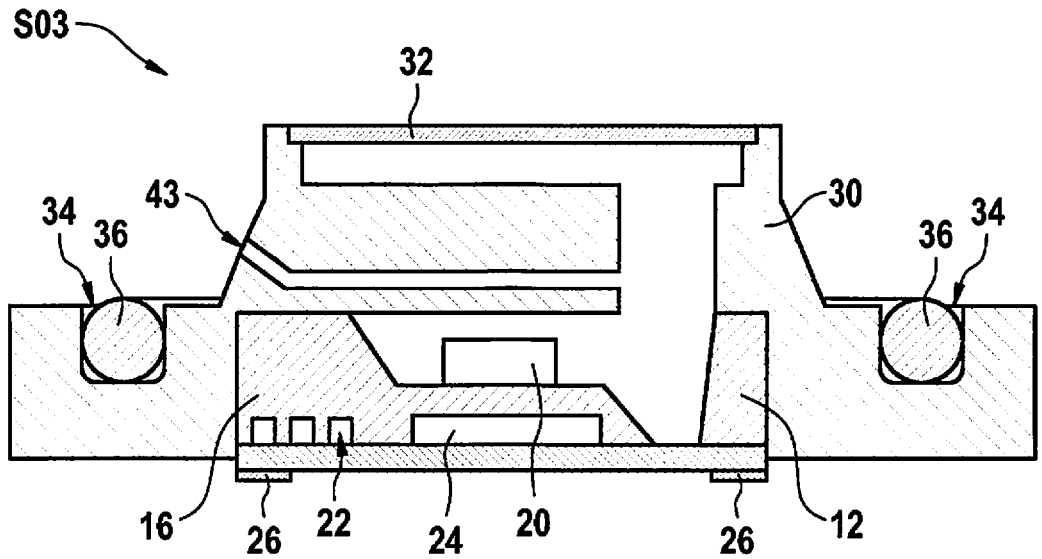
FIG. 3 shows another partial schematic cross-sectional view of the pressure sensor system, depicted during manufacture, according to a specific embodiment of the present invention.

FIG. 3 shows a schematic cross-sectional view of a pressure sensor housing 30 for use in a pressure sensor system 10, pressure sensor unit 12 according to FIG. 1 being inserted into first chamber 41 of cavity 40 of pressure sensor housing 30 and being supported in pressure sensor housing 30. A sealing ring 36 has also been inserted in groove 34.

FIG. 3 at the same time explains a further step S03 of the method for manufacturing a pressure sensor system 10 from FIG. 5. In step S03, pressure sensor unit 12 is introduced into pressure sensor housing 30 provided with diaphragm 32, supported in pressure sensor housing 30.

Figure 4:
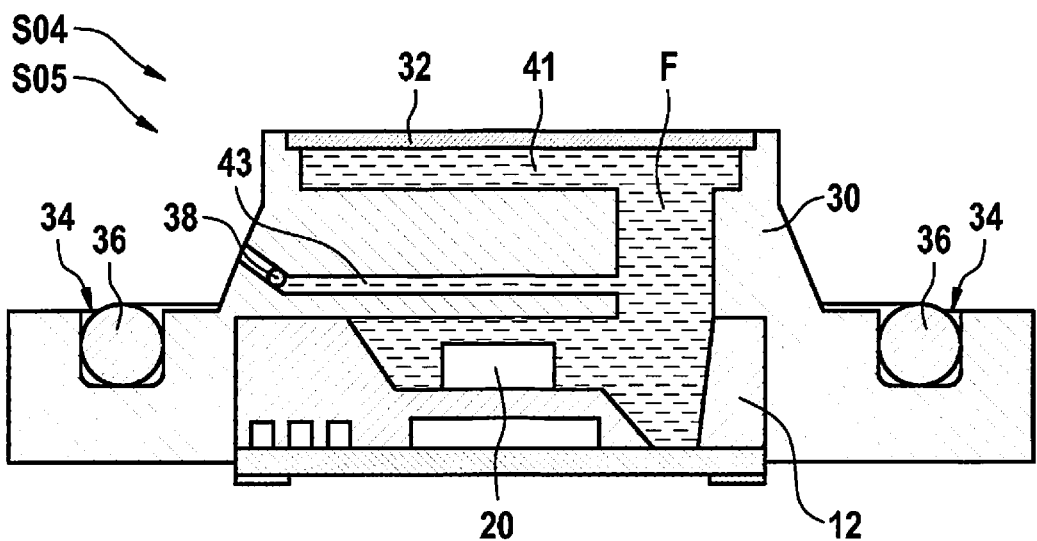
FIG. 4 shows a partial schematic cross-sectional view of the completed pressure sensor system according to the specific embodiment of the present invention.

FIG. 4 shows completed pressure sensor system 10, an incompressible fluid F, in particular oil, having been filled into cavity 40 in such a way that the entire residual volume of cavity 40 is filled with incompressible fluid F. In addition, fluid filling duct 43 is sealed with the aid of a sealing ball 38. The incompressible fluid transmits, on the one hand, the pressure waves from diaphragm 32, via first chamber 41 and second chamber 42, to sensor element 20 and, on the other hand, protects all components, in particular sensor element 20, against potentially damaging environmental influences such as corrosion.

FIG. 5 simultaneously explains two further steps S04 and S05 of the method from FIG. 5 for manufacturing pressure sensor system 10. In step S04, cavity 40 is filled with the incompressible fluid; in particular, the residual volume (remaining after the insertion of pressure sensor unit 12) of cavity 40 is filled with the incompressible fluid, for example, an oil.

In step S05, which is carried out after step S04, fluid filling duct 43 is sealed with the aid of a sealing ball 38, for example, in a so-called ball-press-sealing.

In one or multiple further steps, joints between pressure sensor unit 12 and pressure sensor housing 30 may be filled with a synthetic resin, for example, an epoxy resin, and/or with an adhesive.

FIG. 5 shows a schematic flow chart in which the method steps described above with reference to FIG. 1 through FIG. 4 are graphically combined.

Although the present invention was described above on the basis of the exemplary embodiments, it is not limited thereto.

Instead, the present invention is modifiable in various ways.

What is claimed is:

1. A pressure sensor system, comprising:
 a pressure sensor unit that includes:
  a supporting structure in which there is a cavity and that is formed by a land grid array/mold premold (LGA/MPM) structure;
  a sensor element situated in the cavity; and
  a signal-processing element integrated into or on the supporting structure; and
 a pressure sensor housing:
  that includes a diaphragm;
  that supports the pressure sensor unit;
  a residual volume of which is filled with an incompressible fluid between the diaphragm and the pressure sensor unit; and
  that includes a groove extending around the pressure sensor unit and in which a sealing ring is situatable.

2. The pressure sensor system of claim 1, wherein the groove is situated laterally offset from the pressure sensor unit.

3. The pressure sensor system of claim 1, wherein the sensor element includes an advanced porous silicon MEMS (APSM) sensor element.

4. The pressure sensor system of claim 1, wherein the diaphragm is made from a steel or from a plastic.

5. The pressure sensor system of claim 1, wherein the pressure sensor housing is made from a plastic.

6. The pressure sensor system of claim 1, wherein a joint between the pressure sensor housing and the pressure sensor unit is filled with a synthetic resin and/or an adhesive.

7. The pressure sensor system of claim 1, wherein the incompressible fluid is oil.

8. The pressure sensor system of claim 1, wherein the pressure sensor housing includes a narrow fluid filling duct, which is sealed by a sealing ball.

9. The pressure sensor system of claim 1, wherein the incompressible fluid is synthetic oil.

10. A method for manufacturing a pressure sensor system, the method comprising:
 manufacturing a pressure sensor unit that includes a sensor element, a supporting structure formed by a land grid array/mold premold (LGA/MPM) structure, and at least one signal processing unit by:
  situating the sensor element in a cavity of the supporting structure; and
  integrating the at least one signal processing unit into or on the supporting structure;
 providing a pressure sensor housing including a diaphragm, a cavity adjacent to the diaphragm, and a groove extending around the cavity in which a sealing ring is mountable;

supporting the pressure sensor unit in the cavity of the pressure sensor housing;

filling a residual volume of the cavity of the pressure sensor housing between the diaphragm and the pressure senor unit with an incompressible fluid; and sealing the cavity of the pressure sensor housing with the incompressible fluid filled in the pressure sensor housing.

11. The method of claim 10, wherein the filling takes place through a narrow fluid filling duct in the pressure sensor housing, and wherein a sealing ball is used to seal the cavity of the pressure sensor housing.

* * * * *